US011028900B2

(12) United States Patent
Bier et al.

(10) Patent No.: US 11,028,900 B2
(45) Date of Patent: Jun. 8, 2021

(54) BANDED FRICTION POWER TRANSMISSION BELT

(71) Applicant: GATES CORPORATION, Denver, CO (US)

(72) Inventors: Karla J. Bier, Columbia, MO (US); Douglas R. Sedlacek, Centennial, CO (US); Cynthia Decker, Columbia, MO (US); William Buchholz, Springdale, AR (US); Daniel Beal, Gentry, AR (US)

(73) Assignee: Gates Corporation, Denver, CO (US)

( * ) Notice: Subject to any disclaimer, the term of this patent is extended or adjusted under 35 U.S.C. 154(b) by 492 days.

(21) Appl. No.: 15/841,162

(22) Filed: Dec. 13, 2017

(65) Prior Publication Data

US 2019/0178340 A1   Jun. 13, 2019

(51) Int. Cl.
*F16G 5/22* (2006.01)
*F16G 5/08* (2006.01)

(52) U.S. Cl.
CPC ...... *F16G 5/22* (2013.01); *F16G 5/08* (2013.01)

(58) Field of Classification Search
CPC .................................... F16G 5/22; F16G 5/08
See application file for complete search history.

(56) References Cited

U.S. PATENT DOCUMENTS

| 2,414,822 | A | 1/1947 | Lindsay et al. |
| 2,519,590 | A | 8/1950 | Mitchell et al. |
| 3,784,427 | A | 1/1974 | Griffin |
| 3,832,210 | A | 8/1974 | Rohlfing |
| 4,238,530 | A | 12/1980 | Hollaway et al. |

(Continued)

FOREIGN PATENT DOCUMENTS

| EP | 2570529 | * | 3/2013 |
| JP | 2013213576 A | | 10/2013 |

(Continued)

OTHER PUBLICATIONS

European Patent Office, International Search Report and Written Opinion of the International Searching Authority, International application No. PCT/US2018/058993, dated Feb. 1, 2019.

*Primary Examiner* — Michael R Mansen
*Assistant Examiner* — Mark K Buse
(74) *Attorney, Agent, or Firm* — Alyssa K. Sandrowitz, Esq.

(57) ABSTRACT

A banded frictional power transmission belt with a satin-weave, band fabric wrapped around the outside of the belt. The band fabric may be a satin weave of warp and weft yarns and may include a high-strength, wear-resistant yarn such as aramid fibers, and may include a high-adhesive yarn such as nylon and/or cotton. The aramid and/or nylon fibers may be staple or filament fibers. The band fabric may be treated. The band fabric may have a 4×1 satin weave. The band fabric may be wrapped on a bias. The high-adhesive yarn may predominantly reside on the inside of the fabric contacting said V-belt, and the high-strength, wear-resistant yarn may predominantly reside on the outside of the fabric which is the outer, pulley-contacting surface of the belt. The banded belt may be a V-belt, round belt, dual-V-belt, or multiple V-belts, or have another friction belt profile.

15 Claims, 3 Drawing Sheets

(56) References Cited

U.S. PATENT DOCUMENTS

| | | | |
|---|---|---|---|
| 4,302,197 A * | 11/1981 | Kimura | F16G 1/28 |
| | | | 139/420 R |
| 4,343,666 A | 8/1982 | Wetzel et al. | |
| 4,514,179 A | 4/1985 | Skura et al. | |
| 4,632,665 A | 12/1986 | Skura et al. | |
| 4,891,040 A * | 1/1990 | Nagai | D02G 3/447 |
| | | | 474/267 |
| 4,907,323 A | 3/1990 | Smith et al. | |
| 5,255,419 A | 10/1993 | Stanislaw et al. | |
| 5,529,545 A | 6/1996 | Isshiki et al. | |
| 6,494,235 B1 | 12/2002 | Bruyere et al. | |
| 6,595,883 B1 | 7/2003 | Breed et al. | |
| 6,605,014 B2 | 8/2003 | Isshiki et al. | |
| 7,056,249 B1 * | 6/2006 | Osako | F16G 1/06 |
| | | | 474/260 |
| 7,909,720 B2 | 3/2011 | Burrowes et al. | |
| 2006/0174997 A1 | 8/2006 | Gibson et al. | |
| 2006/0293140 A1 * | 12/2006 | Daugherty | F16G 5/06 |
| | | | 474/261 |
| 2008/0032837 A1 | 2/2008 | Unruh et al. | |
| 2009/0227406 A1 | 9/2009 | Wu et al. | |
| 2010/0275764 A1 | 11/2010 | Egres, Jr. | |
| 2015/0285334 A1 * | 10/2015 | Thomas | F16G 1/10 |
| | | | 474/90 |
| 2016/0208889 A1 * | 7/2016 | Yoshida | C08K 5/098 |
| 2016/0273616 A1 * | 9/2016 | Takehara | F16G 5/20 |
| 2016/0281818 A1 * | 9/2016 | Newsome | B29D 29/08 |
| 2017/0009847 A1 * | 1/2017 | Mitsutomi | D04B 21/20 |
| 2017/0030431 A1 * | 2/2017 | Duke, Jr. | F16G 1/04 |
| 2017/0051810 A1 * | 2/2017 | Ideguchi | F16G 1/28 |
| 2017/0191545 A1 * | 7/2017 | Sekiguchi | C08L 75/04 |
| 2017/0284504 A1 * | 10/2017 | Mitsutomi | B29D 29/10 |

FOREIGN PATENT DOCUMENTS

| | | |
|---|---|---|
| JP | 2017193446 A | 10/2017 |
| WO | 2014191723 A1 | 12/2014 |

* cited by examiner

BANDED FRICTION POWER TRANSMISSION BELT

BACKGROUND OF THE INVENTION

This invention relates generally to a banded friction power transmission belt, such as a V-belt, with one or more outer layers of fabric wrapped around the belt, and specifically to a V-belt with band fabric of a satin weave including some aramid fibers and other fibers.

Covered or banded friction power transmission belts are normally constructed with an outer layer of rubber-impregnated, or other polymer-impregnated fabric surrounding the belt core. The cover or "band ply" provides a number of functions, including protecting the belt from environmental elements, controlling the frictional characteristics of the belt, and resisting wear of the belt as it contacts the sheaves (pulleys) in a frictional belt drive.

U.S. Pat. No. 4,238,530 to Hollaway et al. teaches using a square woven fabric and cutting the fabric at an angle of about 45 degrees into relatively wide strips. The individual strips are then lap spliced together by overlapping the end of one strip with another using a tacky elastomeric compound as an adhesive, and are then wound up onto the form of a roll. The fabric may, if desired, be slit longitudinally into relatively narrow tapes of desired width and length for wrapping around a belt. This method results in transverse splice laps as well as a longitudinal seam from wrapping. The transverse splice laps in particular can cause undesirable periodic belt noise and vibration.

U.S. Pat. No. 3,784,427 to Griffin is representative of the art, disclosing a V-belt that may be wrapped or covered with a bias-cut woven fabric and a method of preparing a bias fabric wherein a continuous strip of bias material is helically cut from a length of tubular woven fabric.

U.S. Pat. No. 2,519,590 to L. W. Mitchell is also representative of the art, disclosing a number of belt shapes that may be covered with a bias-cut woven fabric with warp and weft threads crossing at a 90° angle or with the crossing angle shifted to less or more than 90°.

U.S. Pat. No. 6,595,883 discloses a V-belt suitable for clutching applications with a textile component employing any suitable or conventional type of textile material including weaves of warp and weft threads at any desirable angle of any natural or synthetic variety. In a preferred embodiment the fabric is a nylon/cotton blend bias-fabric weave with warp at an angle of 100 to 130° to the weft, and both oriented in a direction of about 57°±7° to the direction of travel or longitudinal direction of the belt.

The above disclose "full cover" V-belts which are typically manufactured so that one edge of the outer layer of fabric laps over the other edge. U.S. Pat. No. 7,942,773 to Daugherty et al. discloses various arrangements of the cover fabric or fabrics which avoid the lapped edges. Some belts may have multiple layers of fabric on one or more surfaces. The band ply fabric may be a square woven fabric, twill, knit, braid, or a non-woven such as a felt or needle-punched fleece.

U.S. Pat. No. 4,302,197 to Kimura et al. discloses a toothed belt with a tooth cover cloth woven with different types of fibers for the warp and the weft, and one of the warp and weft has a greater exposed surface area on one side of the cloth, and the other of the warp and weft having greater exposure on the opposite side of the cloth. The cloth is a 4/1 twill weave.

It is not known or suggested to use a bias-oriented woven fabric for a banded V-belt cover fabric wherein the warp or weft include staple or filament yarns of aramid, cotton, and nylon, and wherein the weave is a satin weave, modified satin weave, or a sateen.

SUMMARY

The present invention is directed to systems and methods which provide a band fabric for a banded, friction, power transmission belt, such as a banded V-belt.

The invention relates to a banded frictional power transmission belt with a satin-weave, band fabric wrapped around the outside of the belt. The band fabric may be a satin weave of warp and weft yarns. The band fabric may include a blended yarn of two or more fiber materials. The warp and weft yarns may be the same, i.e., a balanced fabric construction. Alternately, the warp and weft yarns may be different, i.e., an unbalanced construction. The band fabric may include a high-strength or high modulus or wear-resistant fiber material or yarn such as aramid fibers which may reside predominantly on the outside of the fabric and belt. The band fabric may include a high-adhesive fiber material or yarn such as nylon or cotton which may reside predominantly on the inside of the fabric bonded to the belt body. The band fabric may be woven as a warp-faced satin or as a weft-faced satin. The band fabric may be oriented parallel to a belt axis or at a bias angle. The fibers of the yarns, such as aramid or nylon fibers, may be staple or filament fibers. The band fabric may be treated. The band fabric may have a 4×1 satin weave. The banded belt may be a V-belt or a round belt, and it may be endless.

If the band fabric is oriented parallel to a belt axis, the fabric may advantageously include a predetermined level of stretch in the parallel yarns, which may be the warp yarns. The amount of stretch may advantageously be from 5% or 10% up to 35% or 80% at a specified load of 2 kg/25-mm width of fabric. Belts with parallel oriented, wrap-stretch fabric are easier and cheaper to produce than the various conventional methods of biasing and shifting fabric, and they do not have any transverse splice laps.

The resulting banded belts may have little or no strike through of inner rubber materials to the surface of the belt. The banded belts may have improved stability of coefficient of friction during use.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 13 illustrates another twelve-harness modified satin weave according to an embodiment of the invention; and.

DETAILED DESCRIPTION

Figure 1:
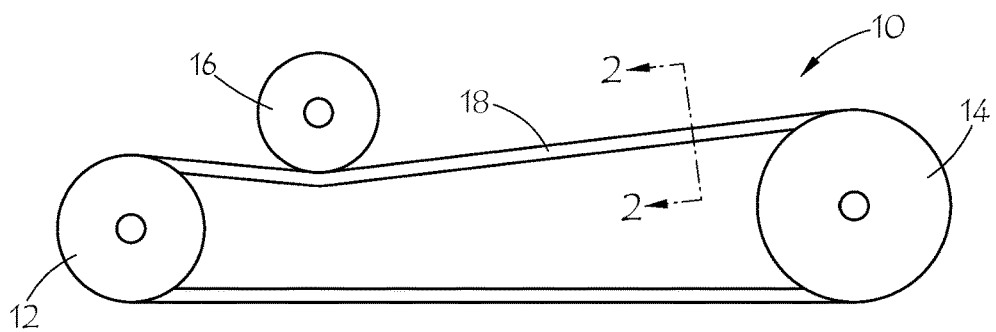
FIG. 1 is a simplified V-belt drive utilizing the inventive V-belt.

FIG. 1 shows a banded friction power transmission belt drive 10 utilizing banded belt 18 according to an embodiment of the invention. In FIG. 1, typical power transmission drive system 10 is shown comprising driver sheave 12, driven sheave 14, belt 18 trained thereabout and wedged therein in driving relation, and flat-faced, idler pulley 16 which may engage the top or wide side of the belt to maintain tension on the belt and remove the slack between the sheaves.

Figure 2:
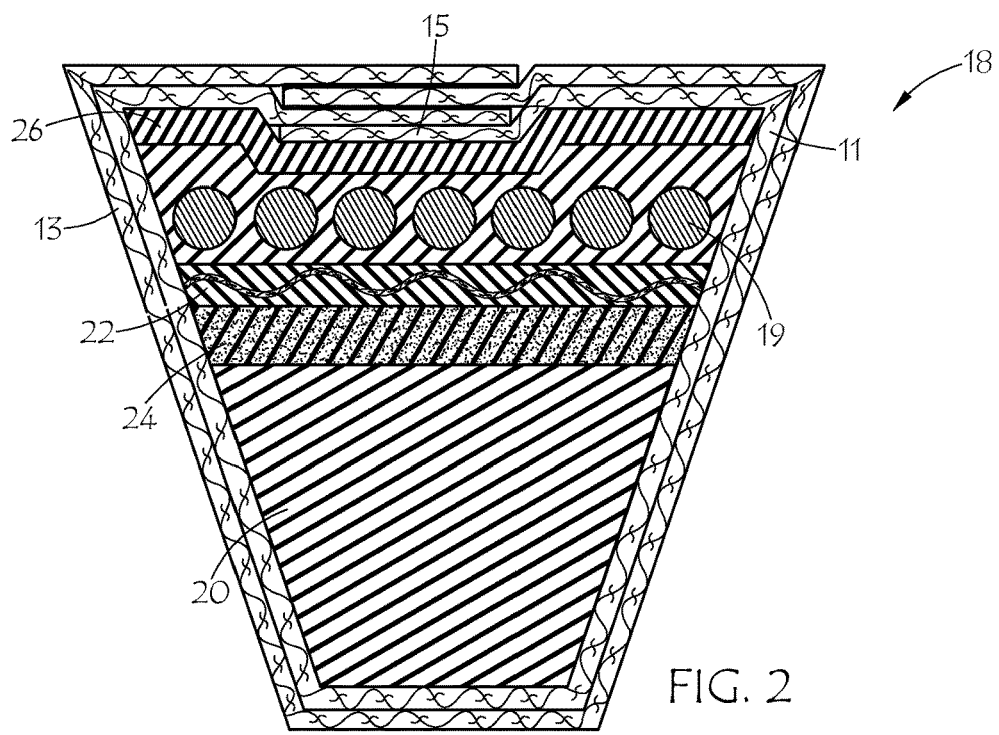
FIG. 2 is a sectional view of the V-belt of the drive of FIG. 1 taken along section 2-2.
Figure 4:
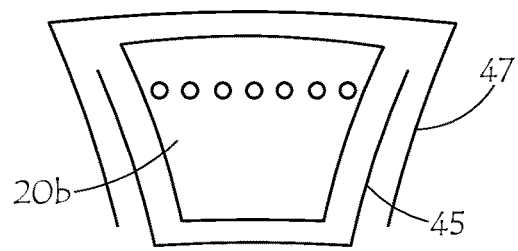
FIG. 4 is a schematic of an alternative band or cover configuration of the invention.
Figure 5:
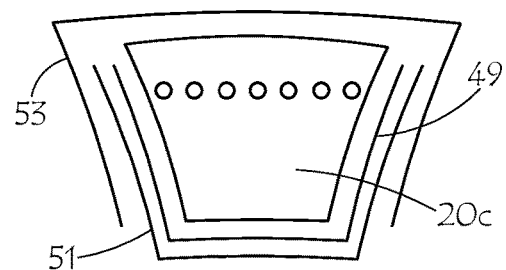
FIG. 5 is a schematic of another alternative band or cover configuration of the invention.

A typical cross-section of banded belt 18 at 2-2 is shown in FIG. 2 in the form of a V-belt. The construction of V-belt 18 includes tensile members 19 embedded in a generally trapezoidal-shaped, belt body which is wrapped in two layers of band-ply (or cover) fabric, inner band 11 and outer band 13. The details of outer band 13 are the subject of this invention. The inventive belt may only have one layer of band-ply fabric, or it may have more than one layer. The belt body may be formed of rubber or rubber-like material, and may include various reinforcement layers, such as compression section rubber 20, tension section rubber layer 26, fiber-loaded rubber layer 24, and reinforcing fabric layer 22 which may be any type of reinforcing or supporting fabric such as woven, non-woven, tire cord, or the like. Any desired number of rubber or reinforcement layers may be used in the belt body. Although the banded belt of the invention may be used for various applications including for automotive and industrial transmission of power between complimentary shaped sheaves or pulleys, the banded belt of the invention is particularly adapted for industrial application. Standard single strand industrial V-belt cross sections applicable for the belt of the invention include industry standard sizes A, B, C, and D, 2L, 3L and 4L and 3V, 5V, 8V and metric sizes SPZ, SPA, SPB and SPC. Any desired frictional belt cross section may utilize the fabric wrap according to the invention. For example, the V-shaped side surfaces may be somewhat concave, and/or the top and bottom surfaces may be crowned as illustrated in FIGS. 4 and 5, or the belts may assume other conventional shape, such as round, or dual-V-shaped. The banded belts may be tied together side by side with a tie band for multiple belts to function as a single belt, for example in a multiple-V-belt drive.

FIG. 2 of the drawings shows bands 11 and 13 wrapped around the belt and lapped at the top surface of the belt at 15. These laps may create a thickness variation. Alternatively, the belt may be constructed with a butt joint(s) or without an overlap. FIGS. 4 and 5 illustrate alternate construction methods that eliminate the overlap of the covers. In FIG. 4, the angled sides and the bottom of belt body 20b are first covered with U-shaped fabric 45, followed by inverted-U-shaped fabric 47. In FIG. 5, the angled sides and the bottom of belt body 20b are first covered with two layers of U-shaped fabric 49 and 51, followed by inverted-U-shaped fabric 53. The U— and inverted-U-shaped band fabrics can be applied in any order desired.

The belt body may be formed of rubber, and by "rubber" is meant a cross-linkable natural or synthetic elastomer which is processable in solid form, e.g., on a mixing mill. Such rubber is typically mixed in a green or unvulcanized form, with appropriate additives, extenders, reinforcements, accelerators, fillers, vulcanizing agents, e.g. sulfur or peroxides, and the like in a suitable batch or continuous mixer, well known in the rubber processing industry. Typical synthetic rubbers useful in the invention include polychloroprene (CR), copolymers of ethylene and propylene (or other α-olefin), terpolymers of ethylene, propylene (or other α-olefin) and diene monomers, e.g. EPDM, styrene butadiene rubber, nitrile rubber, hydrogenated nitrile rubber, natural rubber, butadiene rubber, chlorosulfonated ethylene, ethylene-acrylic copolymers, ethylene-vinylacetate copolymers, silicone rubber, fluoroelastomers, mixtures of the foregoing, and the like.

Any of the various layers of the belt body may be formed of any of the aforementioned rubber materials, which are typically plied up on a building drum as layers or calendared sheets of stock with or without textile reinforcement therein. A fiber loaded layer of the belt body may include any conventional fiber loading, such as cotton, aramid, nylon, polyester, to name a few examples.

Herein, "banded" means wrapped in fabric. A banded belt may be fully wrapped, or partially wrapped. In particular, the banded belt is at least wrapped so that the pulley-contact surface(s) are covered with fabric. A V-belt may be wrapped across the top and up both sides, or across the back and down both sides. The wrap may be two ¾ wraps overlapping to completely cover the belt, being two layers on two sides and one layer on the other two sides as shown in FIG. 4. The wrap may be one or more fabric layers completely wrapping the belt as disclosed in FIG. 2. Banded does not include so-called raw edge or cut-edge V-belts in which a molded belt slab is cut to form the V-shape, resulting in the body materials of the belt being exposed at the angled pulley-contact surfaces. The cut edges could reveal, for example, one or more layers of rubber optionally with one or more transverse layers of reinforcement embedded in the rubber. The fabric wrapping the belt is called the band fabric.

V-belt means the pulley-contact surfaces are the two opposing angled-together sides of a trapezoidal cross-section belt. The angled sides could include some curvature. The V-belt may be an endless belt. The belt back side and/or the belt inner side may have corrugations, or cogs, which may be included to enhance flexibility. However, herein, toothed or synchronous, positive-drive belts are not included and are considered distinct from cogged V-belts or other types of frictional banded belts.

Turning now to a description of the band fabric according to an embodiment of the invention, at least the outer layer of band fabric includes, in the warp or weft, staple or filament yarns of a high performance fiber such as aramid, polyester, nylon, PBO (polybenzobisoxazole), PEEK (polyetheretherketone), PPS (polyphenylenesulfide), fluoropolymer, or blends thereof. The aramid is an aromatic polyamide, which may be para-aramid such as polyparaphenylene terephthalamide, meta-aramid, or an aramid copolymer. The nylon may be any suitable type of polyamide, including for example, nylon 6, nylon 66, nylon 46 or the like. The aramid yarn (i.e. aromatic polyamide) is preferably a para-aramid, such as, for example, a grade of Kevlar, sold under that trade name by DuPont, or a grade of Twaron or Technora, sold under those trade names by Teijin, or a grade of Heracron, sold under that trade name by Kolon Industries, Inc., or a grade of Alkex, sold under that trade name by Hyosung Corporation. Any suitable commercial high-performance yarn or yarns may be used. A preferred nylon yarn is nylon 66. The band fabric could be 100% aramid fiber or 100% nylon fiber, or 100% other high performance fiber.

The band fabric according to an embodiment of the invention, at least the outer layer of band fabric, may include, in the warp or weft, staple or filament yarns of a high adhesive fiber such as nylon or cellulosic fibers. The nylon may be any suitable type of polyamide, including for example, nylon 6, nylon 66, nylon 46 or the like. The cellulosic fiber may be one of more of cotton, flax, hemp, ramie, kenaf, rayon, and the like. The adhesive yarn may be or include cotton or nylon or blends thereof. In a preferred embodiment the band fabric includes aramid yarns, cotton yarns, and nylon or polyester yarns, and the weave is a satin weave or a sateen weave. The weave may be balanced, with the same warp and weft yarns, or the weave may be unbalanced, with different warp and weft yarns. If there are multiple layers of band fabric, the inner layers may be of the same construction as the outer layer, or the inner layers may be any conventional fabric.

The yarns of the band fabric may include blends of aramid and cotton, or blends of aramid and nylon, or blends of aramid and polyester, or blends of aramid, cotton and nylon, or blends of aramid, cotton and polyester. The cotton fibers are staple fibers. The synthetic fibers may be filament or staple fibers. If filament yarns are used blended with a staple yarn, the yarns could be core wrapped or a plied twist of a filament yarn and a staple yarn. The weave of the band fabric may be a balanced weave of such blended yarns.

Figure 3:
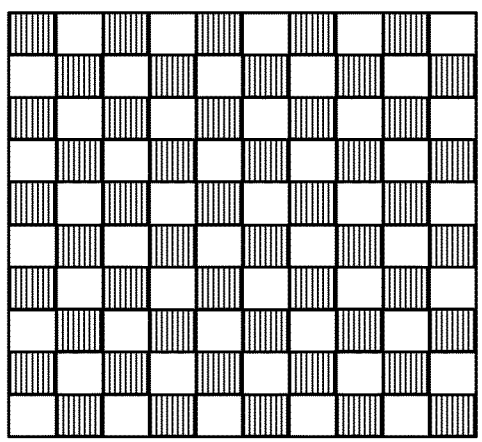
FIG. 3 illustrates a plain woven fabric of the prior art.

Fabric weaves may be illustrated with simple diagrams such as FIG. 3. FIG. 3 shows a conventional plain or square weave. The dark squares represent the vertically running warp yarns when they cross on top of the weft yarns and are therefore visible. The light squares represent the horizontally running weft fibers when they cross on top of the warp yarns and are therefore visible. The plain weave maximizes the number of crossings of the warp and weft, resulting in a strong fabric. Both sides of the plain weave generally look the same, with the same amount of warp and weft exposed on each side. Each intersection in the diagram represents a void which occurs in the middle between two warp yarns and two weft yarns. When the wrapped belt is molded, this void may permit rubber to penetrate to the belt surface. Rubber penetration (or "strike through") may be undesirable. It may be preferred to have the fabric fibers exposed at the belt surface, for example, to provide a certain coefficient of friction or degree of wear resistance. Rubber penetration may significantly increase the coefficient of friction and/or reduce the wear resistance of the belt.

Figure 6:
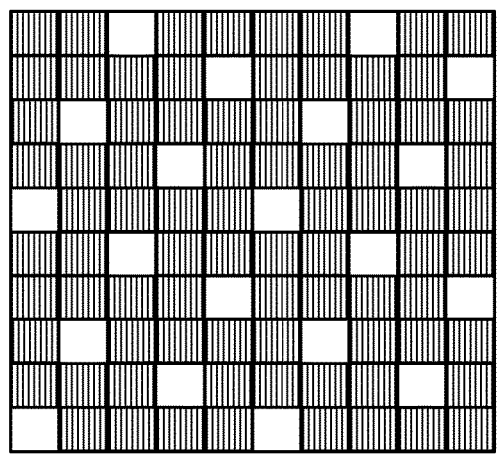
FIG. 6 illustrates a 4/1 satin weave for a V-belt cover fabric according to an embodiment of the invention.

FIG. 6 illustrates a preferred satin weave. The satin weave has relatively few crossing points of warp and weft, and relatively little weft visible on the surface. The warp stays on top of four weft yarns before passing under a single weft yarn. Therefore, the satin weave of FIG. 6 is called a 4×1 satin weave. The crossings where weft is exposed are evenly distributed over the fabric surface, and spaced as far apart from each other as possible. The relatively long runs of exposed warp yarns are called floats. The long floats result in a very smooth surface. The float of the yarns permits the yarns to lay very close together, resulting in fewer and smaller voids, even at the crossings of warp and weft. As a result, the satin weave may result in much less strike through (i.e., rubber penetration) on the belt surface. As a result, the inventive belts may have much more consistent and controllable coefficient of friction and wear.

Figure 7:
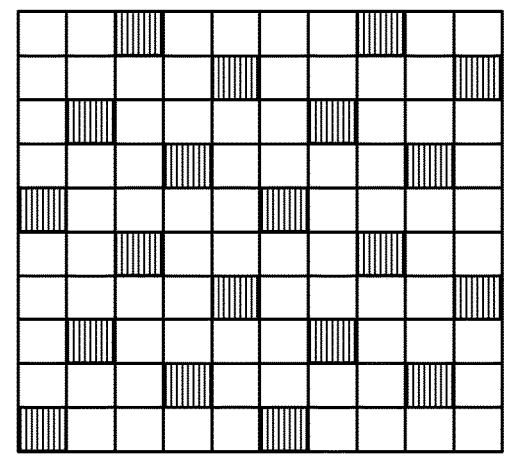
FIG. 7 illustrates the other side of the 4/1 satin weave of FIG. 6.

FIG. 7 illustrates the reverse side of the satin weave fabric of FIG. 6. In FIG. 7, the weft yarns now exhibit the long floats, with relatively little exposure of the warp yarns. As a result of this difference between the two sides of a satin fabric, the use of different yarns for warp versus weft (i.e., an "unbalanced" construction) allows the two sides to be designed for different functions. In the context of the wrapped V-belt, it may be advantageous to use a highly wear resistant yarn for the warp when it is the yarn more exposed to the wear surface of the belt, i.e. the "outside" surface of the fabric, and a yarn with good adhesive properties to rubber for the weft when it is the yarn more exposed to the rubber of the belt body, i.e. the "inside" surface of the fabric. It should be understood that the fabric can be woven either with the warp exposed on the outside surface shown in FIG. 6 (called a warp-faced satin weave), or alternately with the weft exposed (called a weft-faced satin weave). The choice of fabric construction details such as these may depend on the materials needed on each side, or on the desired orientation of the yarns on the belt, in combination with the planned method of cutting the fabric or wrapping the belt.

The fabric may be oriented with either warp or weft parallel to the belt longitudinal axis. The choice of fabric construction may depend then on which yarn the belt designer prefers to run longitudinally or around the length of the belt and which yarn is preferred to run transversely, around the cross section of the belt. Thus, it may be desirable to choose a more reinforcing or higher-modulus yarn for the transverse belt direction and a more flexible yarn for the longitudinal belt direction, and choosing the more wear resistant of the two for the outside, exposed surface, with the more adhesive of the two for the inner or inside surface. All such choices are considered to be within the scope of the invention. One advantage of a parallel orientation of the band fabric is elimination of the need to cut the fabric at an angle, shift the bias angle, and related processing steps.

If the band fabric is oriented parallel to a belt axis, the fabric may advantageously include a predetermined level of stretch in the parallel yarns, which may be the warp yarns. For example the warp yarns may be crimped or texturized or core wrapped with elastic core to give them an increased degree of stretch. Textured nylon may be used for the stretchy warp yarns. The amount of stretch may be from 5% or 10% up to 35% to 80% at specified load of 2 kg/25-mm width of fabric. The fabric may thus have a stretch in warp direction in the range of 5% to 100%, or 10% to 35%, at a specified load of 2 kg/25-mm width of fabric. Thus, for example, the weft or yarns transverse to the belt longitudinal axis may be a high-reinforcing fiber such as aramid or non-textured nylon or polyester, or the like, and the warp or longitudinal yarns may be much more flexible. This may help to maximize the belt transverse stiffness and minimize the belt longitudinal flexibility, both of which are highly desirable in a frictional V-belt. The fabric may be any of the satin weaves described herein, thus also allowing for each side of the fabric to have unique and desirable properties as described herein as well as different directional properties. Alternately, the fabric with a stretch warp may be of a plain or square weave if side-to-side differences are not desired. A warp-stretch band fabric would also be very useful in as a tie band for joining multiple V-belts, or for a cross-cord reinforcement, since it would not require any of the angled cutting, biasing, or shifting steps, yet would still have good transverse strength/stiffness and longitudinal flexibility.

As a non-limiting example, the wear resistant exposed yarn may be or include aramid, nylon, PBO, PEEK, PPS, fluoropolymer, polyester or blends thereof, while the more adhesive yarn may be or include cotton or nylon or blends thereof.

Wrapped V-belts may be constructed with the wrap fabric oriented on the bias. In such a case the bias angle may also be shifted from the natural 90°, to a predetermined angle to provide a desired degree of stretch or flexibility in the longitudinal direction and/or a desired increased stiffness in the transverse direction of the belt. In such a bias-oriented case, it may be preferred to use the same yarn for both the weft yarn and the warp yarn, to provide a "balanced" construction. The bias and bias angle may be achieved by any conventional weaving or post-weaving technique. The bias angle may be shifted on conventional equipment or using conventional techniques, such as shifting on a tenter frame. A continuous strip of bias material may be helically cut from a length of tubular, satin-woven fabric. Strips of bias material may be cut from flat woven fabric at the desired angle and pieced together if longer strips are needed. Alternately straight cut strips may be helically wrapped around the belt at the desired helix or bias angle.

The term "sateen" is often used for fabrics having a satin weave and made of cotton, which is a staple fiber. Since the weave of sateen fabric is still a satin weave, herein, the term "satin" or "satin weave" is used regardless of whether the fabric includes cotton, or cotton blends with other yarns, or other staple yarns. Satin woven fabric consists almost completely of floats in the warp or weft produced in the repeat of the weave, and the points of intersection are distributed as evenly and widely separated as possible. Float means the warp or weft extends over two or more adjacent weft or warp yarns.

Figure 8:
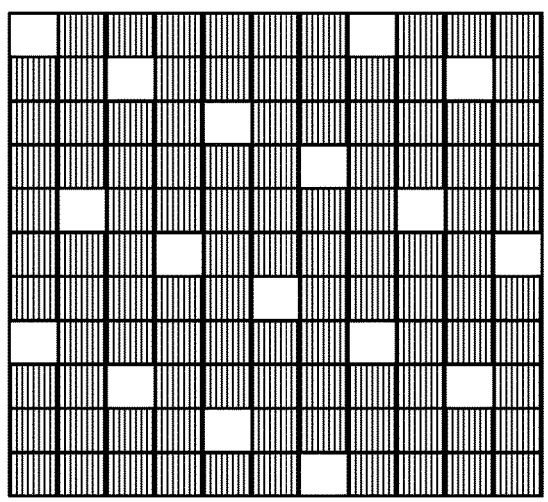
FIG. 8 illustrates a 6/1 satin weave for a V-belt cover fabric according to an embodiment of the invention.
Figure 9:
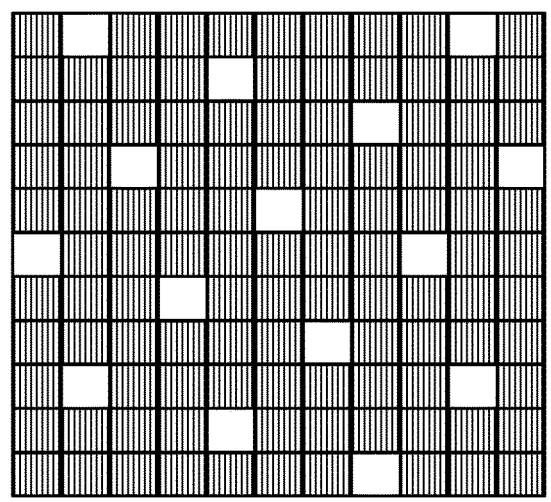
FIG. 9 illustrates a 7/1 satin weave for a V-belt cover fabric according to an embodiment of the invention.
Figure 12:
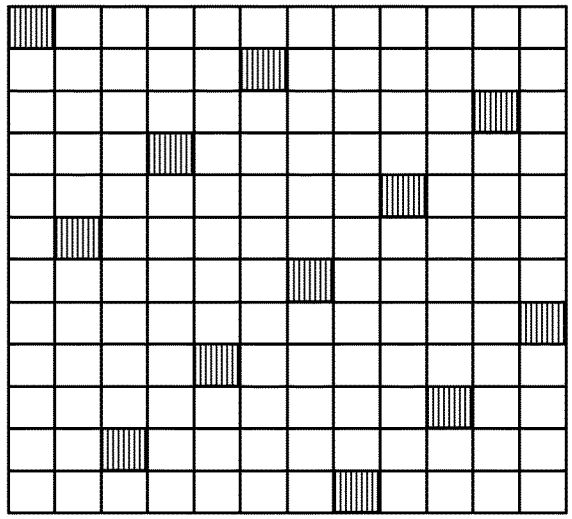
FIG. 12 illustrates a twelve-harness satin weave according to an embodiment of the invention.
Figure 14:
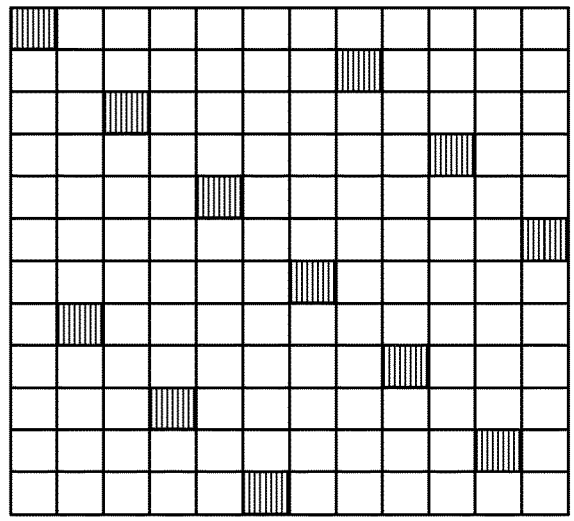
FIG. 14 illustrates another twelve-harness satin weave according to an embodiment of the invention.

In other embodiments, satin weaves other than the 4×1 weave of FIG. 6 may be used. FIG. 8 illustrates another preferred satin weave, namely a 6×1 satin weave. This satin weave has even fewer crossing points of warp and weft, and relatively little weft visible on the surface. The warp stays on top of six weft yarns before passing under a single weft yarn. Likewise, FIG. 9 illustrates another preferred satin weave, namely a 7×1 satin weave. FIG. 12 illustrates an 11×1 satin. FIG. 14 illustrates an alternate 11×1 satin.

Figure 10:
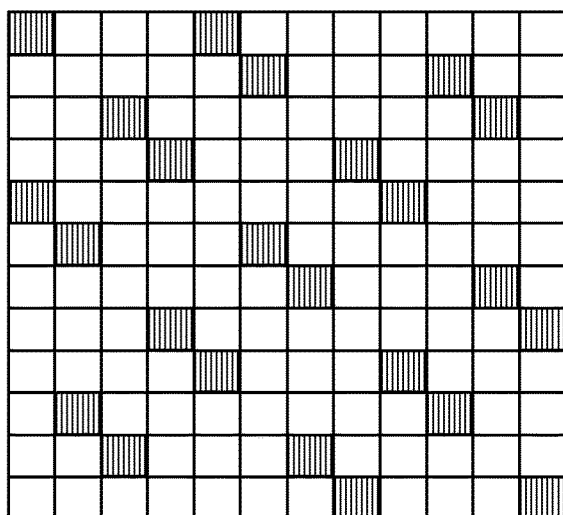
FIG. 10 illustrates a twelve-harness modified satin weave according to an embodiment of the invention.
Figure 11:
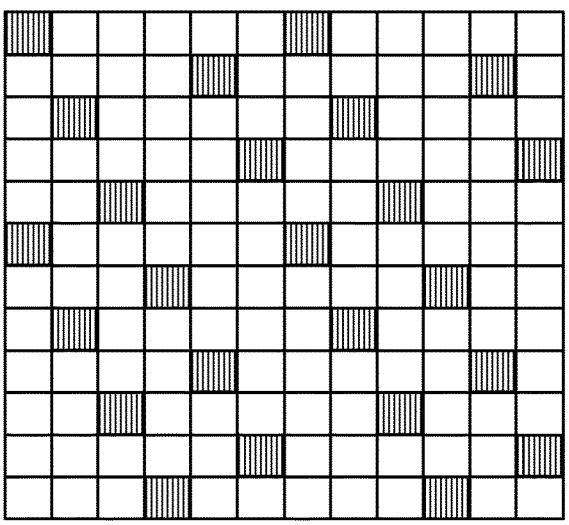
FIG. 11 illustrates another twelve-harness modified satin weave according to an embodiment of the invention.
Figure 13:
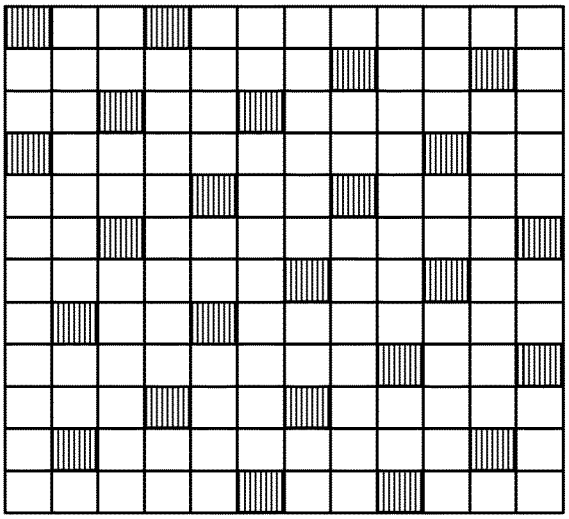

The satin weaves may be varied from those illustrated in FIGS. 6-9, by changing the spacing or regularity of the weave. For example, a 6×1 satin with different length of warp floats versus weft floats is conceivable. Likewise, a so-called crowsfoot satin weave may have a series of spaced apart crossings where there are two adjacent (or diagonally adjacent) exposed wefts, instead of the single wefts seen in FIGS. 6-9. Such alternative weave patterns are herein referred to as modified satin weaves. A 3×1 satin is most commonly called a crowfoot satin. FIG. 10 is an example of a modified satin with longer floats than a simple 3×1 crowfoot, but with a similar diagonally paired crossing pattern. FIGS. 10, 11, and 13 illustrate some more examples of modified satin weaves which may be used to practice the invention.

The weaves shown in FIGS. 10-14 are weft-faced, but it should be understood that they can be warp-faced instead.

The weaves may be identified in terms of the number of harnesses used to create them on a loom, and the shift pattern. For example, the 4×1 satin of FIGS. 6 and 7 may be woven with five harnesses, shifting by two or three each row. FIG. 8 may be woven with seven harnesses shifting by two or five each row. The weave of FIG. 9 may be woven with eight harnesses shifting by three or five each row. FIGS. 10-14 may each be woven with twelve harnesses. FIG. 10 may be woven with twelve harnesses shifting by five each row and resulting in alternating floats of three and seven. FIG. 11 may be woven with twelve harnesses shifting alternately by three and four each row, resulting in floats of five. FIG. 13 may be woven with twelve harnesses shifting by seven each row, resulting in alternating floats of eight and two. The 11×1 satin weaves of FIG. 12 and FIG. 14 may be woven with twelve harnesses shifting by five or seven, respectively.

Preferably the band fabric has long floats as described above. There may be a combination of long floats and short floats. Preferably the length of the long floats is three or more, or four or more, or five or more, or from four to eleven.

The band fabric may include one or more treatments to impart additional functionality, such as modifying the coefficient of friction, improving adhesion to the belt body, providing some electrical or static conductivity, adding thickness or bulk, or the like. The treatment may be by dipping, rolling, or spraying which coats one or both sides of the fabric or penetrates into or throughout the fabric. Examples include resorcinol-formaldehyde-latex ("RFL") coatings, epoxy-latex coatings, rubber cement coatings or other types of latex, liquid, or polymeric coatings. The treatment may be a rubber, plastic, or other polymeric film applied by lamination or by calendering, such as a rubber friction coating or rubber skim coating.

The following examples ("Ex.") illustrate the benefits of the inventive belt over comparative examples ("Comp. Ex.) of conventional belts. The belts were all constructed with the same aramid tensile members, polychloroprene belt body compounds, RFL dip, and CR rubber-cement upcoat fabric treatments. Only the band fabric was varied. The belts were constructed and tested in pairs, with one and two layers of band fabric respectively. Comp. Ex. 1 and Comp. Ex. 2 had conventional nylon/cotton blend (25/75), plain-woven, band fabric. Comp. Ex. 3 and Comp. Ex. 4 had a conventionally plain-woven aramid/nylon/cotton blend (20/20/60), band fabric. The fabrics of Comp. Ex. 1-4 were plain woven, and balanced as illustrated in FIG. 3 and cut on the bias for wrapping. The inventive fabric for Ex. 5, Ex. 6, and Ex. 7 was a blend of nylon, cotton, and aramid staple yarns with a balanced, 4/1 satin weave as illustrated in FIGS. 6-7, also coated with the same treatments. In all these examples the band fabrics are tenter-shifted, cut and applied on a bias. Table 1 lists these examples and the materials used in the banded V-belts. It was determined that the amount of core rubber material was a little too much for the closed belt mold in Ex. 5, so Ex. 7 was a repeat of Ex. 5 with the core rubber adjusted downward slightly. This adjustment improved the strike-through significantly.

The most significant benefit of the satin weave is elimination of the strike-through of rubber from the inside of the belt to the belt surface. The strike-through rating in Table 1 is based on a subjective measure of the area fraction of the belt surface that is covered by rubber flowing out from the inside of the fabric. A rating of 1 means no strike-through is visible to the naked eye or can be felt by hand, while a rating of 5 means complete rubber coverage of the surface due to strike-through. In this case, four people each ranked two belts of each construction to the nearest integer rating, thus resulting in the average values reported in Table 1. The plain weaves of the comparative examples allow significant amounts of rubber to flow through the voids at the crossing of the warp and weft yarns. Note that this occurs even with two layers of fabric. On the other hand, the inventive belts with satin weave allow very little or sometimes even no visible rubber strike-through, earning a 1.0 rating for Ex. 6 and Ex. 7.

Ex. 8 and Ex. 9 use a warp-stretch, plain-woven fabric oriented with the stretchy warp parallel to the belt longitudinal direction. The warp of the warp-stretch fabric is all nylon, with the nylon warp textured to result in the fabric having a stretch in the warp direction in the range from 10% to 35% at a load of 2 kg/25-mm width. The weft is all para-aramid yarn. The fabric was applied without shifting the warp/weft angle. Surprisingly, even with the plain weave, the warp stretch fabric had no visible strike through, and fairly stable COF. It is expected that making it in a satin weave would also result in no strike through, and even more stable COF.

The belts were then run on a tension ratio slip test, which measures the amount of belt slip at various levels of tension ratio, measuring the coefficient of friction ("COF") both before and after the test. For all of the comparative belt examples, the COF increases significantly during the test. The inventive belt examples exhibit very stable COF values, with minimal or no change during the test. Thus, the inventive belts should provide longer, more predictable performance at the COF level of the freshly made belt.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

TABLE 1

| | Comp. Ex. 1 | Comp. Ex. 2 | Comp. Ex. 3 | Comp. Ex. 4 | Ex. 5 | Ex. 6 | Ex. 7 | Ex. 8 | Ex. 9 |
|---|---|---|---|---|---|---|---|---|---|
| Fabric Weave | plain | plain | plain | plain | satin | satin | satin | plain | plain |
| Fabric Treatment | RFL+ upcoat | RFL+ upcoat | RFL+ upcoat | RFL+ upcoat | RFL+ upcoat | RFL+ upcoat | RFL+ upcoat | RFL+ upcoat | RFL+ upcoat |
| Fabric Materials | nylon cotton | nylon cotton | aramid nylon cotton | aramid nylon cotton | aramid nylon cotton | aramid nylon cotton | aramid nylon cotton | nylon/ stretch nylon | nylon/ stretch nylon |
| Number of Layers | 1 | 2 | 1 | 2 | 1 | 2 | 1 | 1 | 2 |
| Strike-through Rating | 2.0 | 1.8 | 1.5 | 1.5 | 1.8 | 1.0 | 1.0 | 1.0 | 1.0 |
| COF Before Slip Test | 0.185 | 0.19 | 0.178 | 0.13 | 0.18 | 0.165 | 0.175 | 0.185 | 0.185 |
| COF After Slip Test | 0.23 | 0.22 | 0.20 | 0.18 | 0.19 | 0.155 | 0.155 | 0.21 | 0.205 |

What is claimed is:

1. A banded friction power transmission belt comprising a band fabric wrapped onto the outside of the belt, wherein the band fabric comprises a crowsfoot satin weave or another modified satin weave and has warp yarns and weft yarns; wherein said band fabric comprises two or more different fiber materials; wherein said warp yarns and weft yarns are of different yarn constructions; and wherein the yarns residing primarily on the outside of the band fabric comprise a high-strength, wear-resistant, aramid, fiber material, and the yarns residing primarily on the inside of the band fabric comprise a high-adhesive, nylon or cotton, fiber material.

2. The banded belt of claim 1 wherein said-modified satin weave is weavable with twelve harnesses.

3. The banded belt of claim 1 wherein said at least one of said warp yarns and weft yarns comprises a blend of two or more fiber materials.

4. The banded belt of claim 3 wherein said blend comprises two or more fiber materials selected from the group consisting of aramid, cotton, nylon, and polyester.

5. The banded belt of claim 1 wherein said warp yarns and said weft yarns are of the same yarn construction.

6. The banded belt of claim 1 wherein said yarns residing primarily on the inside of the band fabric comprise cotton as the high-adhesive fiber material.

7. The banded belt of claim 1 wherein said yarns residing primarily on the inside of the band fabric comprise nylon as the high-adhesive fiber material.

8. The banded belt of claim 1 wherein the aramid fibers are staple fibers.

9. The banded belt of claim 7 wherein the aramid fibers are filament fibers.

10. The banded belt of claim 1 wherein said band fabric further comprising floats of one of said warp yarns and said weft yarns;

wherein said floats comprise two or more different lengths of floats.

11. The banded belt of claim 1 in the form of a V-belt.

12. The banded belt of claim 1 wherein the band fabric is oriented at a bias angle with respect to the longitudinal belt direction.

13. The banded belt of claim 1 wherein said yarns comprise aramid fibers.

14. The banded belt of claim 1 wherein the warp yarns have a stretch resulting in the band fabric having a stretch in the range of 5% to 100% at a specified load of 2 kg/25-mm width of fabric.

15. A banded friction power transmission belt comprising a band fabric wrapped onto the outside of the belt, wherein the band fabric comprises a satin weave or a modified satin weave and has warp yarns and weft yarns; wherein said warp yarns and weft yarns comprise a three-component blend of aramid, cotton, and nylon or polyester fibers.

* * * * *